(12) United States Patent
Lin (10) Patent No.: US 12,267,862 B2
(45) Date of Patent: Apr. 1, 2025

(54) METHOD FOR ALLOCATING RESOURCES AND RECEIVING A RESOURCE ALLOCATION

(71) Applicant: Orange, Issy-les-Moulineaux (FR)

(72) Inventor: Hao Lin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 587 days.

(21) Appl. No.: 17/046,216

(22) PCT Filed: Apr. 4, 2019

(86) PCT No.: PCT/FR2019/050785
§ 371 (c)(1),
(2) Date: Jan. 26, 2021

(87) PCT Pub. No.: WO2019/197755
PCT Pub. Date: Oct. 17, 2019

(65) Prior Publication Data
US 2021/0168824 A1    Jun. 3, 2021

(30) Foreign Application Priority Data

Apr. 11, 2018   (FR) ...................................... 1853157

(51) Int. Cl.
*H04L 5/00*   (2006.01)
*H04B 7/06*   (2006.01)
*H04W 40/00*  (2009.01)
*H04W 56/00*  (2009.01)
(Continued)

(52) U.S. Cl.
CPC ......... *H04W 72/56* (2023.01); *H04W 72/044* (2013.01)

(58) Field of Classification Search
CPC ... H04W 72/044; H04W 28/26; H04W 72/56; H04L 5/0053; H04L 1/0025;
(Continued)

(56) References Cited

U.S. PATENT DOCUMENTS

| 2010/0014423 A1 | 1/2010 | Furuskar et al. |
| 2011/0154322 A1* | 6/2011 | Nayar .................... G06F 1/324 718/1 |

(Continued)

FOREIGN PATENT DOCUMENTS

WO    WO 2018/064360 A1    4/2018

OTHER PUBLICATIONS

Nokia et al., "On UL multiplexing between eMBB and URLLC", vol. RAN WG1, No. Athens, Greece; Feb. 26, 2018-Mar. 2, 2018, Feb. 17, 2018, 3GPP Draft; R1-1802549_UL_MULTIPLEXING_FINAL, 3$^{rd}$ Generation Partnership Project (3GPP), Mobile Competence Centre; 650, Route Des Lucioles; F-06921 Sophia-Antipolis Cedex; France.

(Continued)

*Primary Examiner* — Marcus Smith
*Assistant Examiner* — Jason A Harley
(74) *Attorney, Agent, or Firm* — Knobbe, Martens, Olson & Bear, LLP (57) ABSTRACT

A method for allocating resources on an uplink between a user terminal and a base station of a radio communication network multiplexing the data in resource blocks is disclosed. Such a method implements a standard allocation mode associated with a standard transmission mode of transmission by the terminal; and a priority allocation mode associated with a priority mode of transmission by the terminal. The network favors the priority allocation mode and can allocate to the terminal, according to the priority allocation mode, at least one resource block previously allocated according to the standard allocation mode, introducing a situation of allocation collision. In such a situation, the network implements a temporary allocation mode to allocate at least one replacement resource block in the standard transmission mode, implementing a number of (Continued)

signalling portions containing information on resource allocation greater than that used in the standard allocation mode.

16 Claims, 6 Drawing Sheets

(51) Int. Cl.
*H04W 72/04* (2023.01)
*H04W 72/044* (2023.01)
*H04W 72/12* (2023.01)
*H04W 72/56* (2023.01)

(58) Field of Classification Search
CPC . H04L 2209/80; H04L 5/0023; H04L 5/0005; H04L 5/0082
USPC .............. 370/329, 330; 455/450, 452.1
See application file for complete search history.

(56) References Cited

U.S. PATENT DOCUMENTS

| | | | | |
|---|---|---|---|---|
| 2013/0010729 A1* | 1/2013 | Novak | ............... | H04L 65/1101 370/329 |
| 2017/0257876 A1* | 9/2017 | Loehr | ............... | H04W 28/0263 |
| 2018/0124711 A1* | 5/2018 | Hosseini | ............... | H04L 5/0044 |

OTHER PUBLICATIONS

VIVO. "Remaining issues on multiplexing data with different transmission durations", vol. RAN WG1, No. Reno, USA; Nov. 27, 2017-Dec. 1, 2017, Nov. 18, 2017, 3GPP Draft; R1-1719798_MULTIPLEXING Data With Different Transmission Durations_Final, $3^{rd}$ Generation Partnership Project (3GPP), Mobile Competence Centre; 650, Route Des Lucioles; F-06921 Sophia-Ant.

Mitsubishi Electric. "Discussions on UL multiplexing", vol. RAN WG1, No. Chennai, China; Apr. 16, 2018-Apr. 20, 2018, Apr. 6, 2018, 3GPP Draft; R1-1804947-URLLC_92B_MITBS_D, $3^{rd}$ Generation Partnership Project (3GPP), Mobile Competence Centre; 650, Route Des Lucioles; F-06921 Sophia-Antipolis Cedex; France.

International Search Report dated Jul. 3, 2019, issued in Patent Cooperation Treaty Application No. PCT/FR2019/050785.

* cited by examiner

METHOD FOR ALLOCATING RESOURCES AND RECEIVING A RESOURCE ALLOCATION

CROSS-REFERENCE TO RELATED APPLICATIONS

This application is filed under 35 U.S.C. § 371 as the U.S. National Phase of Application No. PCT/FR2019/050785 entitled "METHOD FOR ALLOCATING RESOURCES, METHOD FOR RECEIVING A RESOURCE ALLOCATION, CORRESPONDING COMPUTER PROGRAM PRODUCTS, MODULES AND SIGNAL" and filed Apr. 4, 2019, and which claims priority to FR 1853157 filed Apr. 11, 2018, each of which is incorporated by reference in its entirety.

BACKGROUND

Technical Field

The field of the invention is that of the implementation of radio communication networks. The invention relates more particularly to the reduction of the latency in such radio communication networks.

The invention has numerous uses, in particular, but not exclusively, in the field of cellular radio communication networks compliant with the latest/or future 3GPP (3rd Generation Partnership Project) standards, in particular for the terminals able to implement several categories, or modes, of transmission.

Description of the Related Technology

New-generation cellular networks, in particular the 5G networks being standardized within the 3GPP, are provided from the moment of their design to support various categories of services, each category having different technological constraints.

For example, 5G networks are developed around three categories of services corresponding to three transmission modes implemented to exchange the data between the base station and the terminals that are connected to it. More particularly, the three modes in question are:
  mMTC (massive Machine Type Communications), more particularly intended for low throughput and low energy consumption transmissions of the "smart object" type;
  eMBB (enhanced Mobile Broadband), more particularly intended for very high throughput transmissions; and
  URLLC (Ultra-Reliable and Low Latency Communications), more particularly intended for transmissions of data with very low latency in the network.

Among the characteristics specific to each transmission mode are the access method by the terminals to the radio resources available on the uplink in the direction of the base station, and thus the allocation method of these resources.

For example, since mMTC transmissions are adapted to "smart objects", the access to the resources on the uplink is conventionally carried out by contention. In other words, the terminals themselves decide to access the media and to start a transmission by using a particular radio resource among those dedicated to this type of transmission. This allows the mechanisms of request and of allocation of resources that are costly in terms of signalling to be avoided, but at the expense of potential collisions in the network.

In contrast, the transmissions of the eMBB and URLLC type are intended for higher throughputs. In order for the additional cost related to the signalling to remain low with respect to the throughput of data, the access to the radio resources by the terminals is conventionally carried out by scheduling: the terminals obey a base station that specifically allocates the available resources. In practice, the terminal sends an allocation request (Scheduling Request or SR) to the network, in particular to the base station, to which the network responds by an allocation of a particular resource on the uplink (Uplink grant or UL). The terminal then transmits its data towards the base station via the radio resource previously allocated according to this mechanism.

However, the transmissions of the eMBB and URLLC type do not have the same priority. Since the URLLC transmissions are generally associated with services that require a very low latency in the network, for example for remote medicine or autonomous vehicle uses, the radio resources on the uplink are allocated thereto with priority. Thus, for a terminal implementing both transmissions of the eMBB type and transmissions of the URLLC type, it can happen that one or more transmissions of the eMBB type are delayed to a later time because of a situation of temporal collision with a transmission of the URLLC type to which the resources on the uplink are allocated with priority.

The risk is that in certain cases, the delay is repeated several times, and that the allocation to a service implementing a transmission of the eMBB type, or more generally less demanding in terms of reactivity, is in the end greatly, or even too, delayed. There is therefore a need to control the latency in such networks, in particular for the transmissions having a lower priority, for example transmissions of the eMBB type.

SUMMARY OF CERTAIN INVENTIVE ASPECTS

Thus, according to a first aspect, the invention relates to a method for allocating resources on an uplink between a user terminal and a base station of a radiocommunication network multiplexing the data in resource blocks distributed in time and in frequency in time intervals. Such an allocation method implements at least two modes of resource allocation:
  a first allocation mode, called standard allocation mode, associated with a first mode of transmission by the terminal, called standard transmission mode, and implementing at least one signalling portion containing information on resource allocation in each time interval; and
  a second allocation mode, called priority allocation mode, associated with a second mode of transmission by the terminal, called priority transmission mode.

According to the invention, the network favours the priority allocation mode and can allocate to the terminal, according to the priority allocation mode, at least one resource block previously allocated according to the standard allocation mode, introducing a situation of allocation collision. In such a situation of collision, the network implements a temporary allocation mode to allocate at least one replacement resource block in the standard transmission mode, implementing a number of signalling portions containing information on resource allocation greater than that used in the standard allocation mode, in each time interval.

Thus, the invention proposes a novel and inventive solution to allow the reduction of the latency associated with the standard transmission mode in the radio communication network, involving adopting, temporarily, an allocation mode having a greater signalling frequency for this standard transmission mode.

More particularly, by switching to the temporary allocation mode having a signalling frequency greater than the standard mode, the terminal has a greater chance of being allocated new resources on the uplink in a short time in order to emit the data on standby after the temporal collision. This reduces the latency associated with the standard transmission mode in the radio communication network.

According to a specific embodiment, the allocation method comprises the following steps:
   allocating, to the terminal, at least one first resource block on the uplink according to the standard allocation mode;
   allocating, to the terminal, at least the first resource block on the uplink according to the priority allocation mode;
   detecting a situation of temporal collision between the allocations of said at least one first resource block; and
   temporarily changing the mode of resource allocation associated with the standard transmission mode from the standard allocation mode to the temporary allocation mode to allocate said at least one replacement resource block, the temporary change being triggered by the detection.

According to a specific embodiment, the allocation method further comprises a step of returning to the standard allocation mode for the standard transmission mode, after the allocation of said at least one replacement resource block.

Thus, the additional consumption related to the use of the temporary allocation mode is controlled (the temporary allocation mode consuming more energy that the standard mode due to the greater frequency of the signalling).

The invention also relates to a method for reception, by a user terminal, of an allocation of resources on an uplink between the terminal and a base station of a radio communication network multiplexing the data in resource blocks distributed in time and in frequency in time intervals.

Such a reception method receives information on resource allocation according to at least two modes of resource allocation:
   a first mode of resource allocation by the network, called standard allocation mode, associated with a first mode of transmission by the terminal, called standard transmission mode, the standard allocation mode implementing at least one signalling portion containing information on resource allocation in each time interval and
   a second mode of resource allocation by the network, called priority allocation mode, associated with a second mode of transmission by the terminal, called priority transmission mode.

According to the invention, when at least one resource block previously allocated according to the standard allocation mode is then allocated according to the priority allocation mode, introducing a situation of allocation collision, the terminal receives information on resource allocation according to a temporary allocation mode for the allocation of at least one replacement resource block in the standard transmission mode, implementing a number of signalling portions greater than that used in the standard allocation mode, in each time interval.

Thus, the terminal implements the principle of the invention by implementing steps symmetrical to those implemented by the network without requiring additional signalling. This further minimizes the overall consumption of the system as well as the load of the network.

According to a specific embodiment, the method for receiving an allocation comprises the following steps:
   receiving an allocation of at least one first resource block on the uplink allocated according to the standard allocation mode;
   receiving an allocation of said at least one first resource block on the uplink allocated according to the priority allocation mode;
   detecting a situation of temporal collision between the allocations of said at least one first resource block; and
   temporarily changing the mode of reception of an allocation of resources associated with the standard transmission mode from the standard mode of reception of an allocation to the temporary mode of reception of an allocation to receive the allocation of said at least one replacement resource block, the temporary change being triggered by the detection.

According to a specific embodiment, the method for receiving an allocation further comprises a step of returning to the standard mode of reception of an allocation for the standard transmission mode after the reception of the allocation of said at least one replacement resource block.

Thus, the additional consumption related to the use of the priority mode of reception is controlled.

According to a specific embodiment, for at least one given resource block allocated selectively according to the standard allocation mode or the temporary allocation mode for the standard transmission mode, information on allocation of said at least one given resource block is transmitted towards the terminal in at least one resource block of a signalling portion, called common resource block.

Thus, the terminal is capable of receiving a resource allocation even when the mode of reception of an allocation that it implements is not the mode of reception adapted to the allocation mode implemented by the network.

In this case, according to an efficient approach, said at least one common resource block comprises a field for identification of allocation mode indicating to the terminal which one out of the standard and temporary allocation modes is implemented in the standard transmission mode.

Thus, the terminal is capable of determining whether the mode of reception of an allocation that it implements is indeed the one adapted to the allocation mode implemented on the network side, or whether it must change its mode of reception.

According to a specific embodiment, after a situation of collision, the temporary allocation mode is implemented over a predetermined period of time, for the allocation of at least one replacement resource block for the standard transmission mode. After said period of time, the standard allocation mode is once again implemented.

In this case, according to an efficient approach, the allocation method or the method for reception of an allocation further comprises the following steps:
   triggering a counter upon detection of the situation of temporal collision; and
   returning to the standard allocation mode for the standard transmission mode, if the allocation mode currently associated with the standard transmission mode is the temporary allocation mode and the counter indicates that a predetermined period of time has passed since the triggering.

Thus, if when the predetermined period of time has passed the network has not yet been able to allocate a resource to the terminal according to the temporary allocation mode (for example if the network is busy since it is overloaded), the corresponding modes of allocation and of reception still go back to the standard modes in order to control the energy consumption of the system.

According to a specific embodiment, to signal allocations to the terminal, the standard allocation mode uses only temporally adjoining resource blocks at the beginning or at the end of time intervals on a downlink between the base station and the terminal. To signal allocations to the terminal, the temporary allocation mode uses resource blocks distributed according to an equally distributed temporal schema inside time intervals on the downlink (for example the time intervals are radio frames according to the standard implemented by the radio communication network).

According to a specific embodiment, the radio communication network is of the fifth-generation cellular type, the standard transmission mode is of the eMBB (enhanced Mobile Broadband) type, and the priority transmission mode is of the URLLC (Ultra-Reliable and Low Latency Communications) type.

The invention also relates to a computer program product comprising program code instructions for the execution of the steps of the allocation method or of the method for reception of an allocation as described above.

The invention also relates to a module for allocating resources. Such an allocation module is in particular capable of implementing the method for allocating resources according to the invention (according to any one of the various aforementioned embodiments). Thus, the features and advantages of this module are the same as those of the allocation method described above. Consequently, they are not described in more detail.

The invention also relates to a module for receiving an allocation of resources. Such a module for receiving an allocation is in particular capable of implementing the method for receiving an allocation of resources according to the invention (according to any one of the various aforementioned embodiments). Thus, the features and advantages of this module are the same as those of the method for receiving an allocation described above. Consequently, they are not described in more detail.

It is noted here that, according to the embodiments and the developments, such modules can comprise hardware and/or software means. A module can also consist of several distinct hardware and/or software elements, or modules, interacting with each other.

The invention also relates to a signal emitted by a base station of a radio communication network towards at least one terminal, multiplexing data in resource blocks distributed in terms of time and in terms of frequency in time intervals. Such a signal comprises at least one signalling portion for the allocation of resources comprising a field for identification of the allocation mode implemented in the signalling portion, out of standard and temporary allocation modes.

BRIEF DESCRIPTION OF THE DRAWINGS

Other features and advantages of the invention will appear upon reading the following description, given as an example that is for informational purposes and non-limiting, and the appended drawings, in which.

DETAILED DESCRIPTION OF CERTAIN ILLUSTRATIVE EMBODIMENTS

In all the drawings of the present document, the identical elements and steps are designated by the same reference.

Issue that the Invention Resolves

Figure 1:
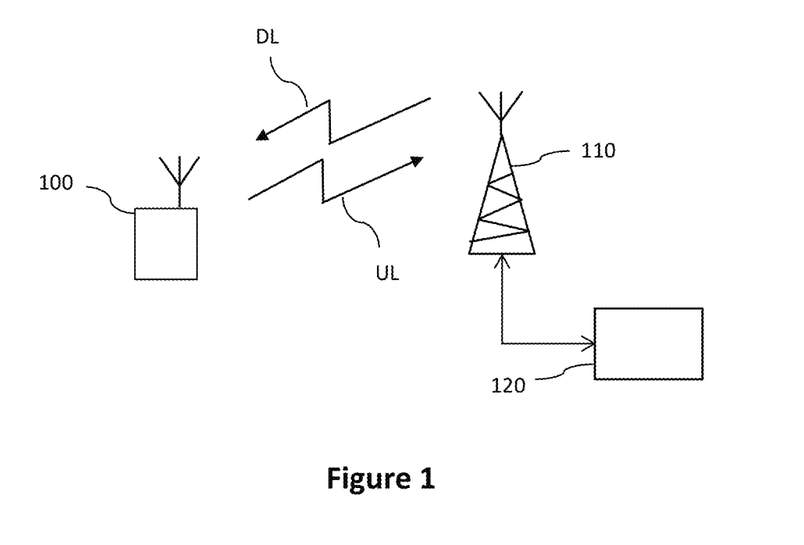
FIGS. 1, 2a and 2b illustrate the problem of temporal collision between allocated resources, according to the prior art, on the uplink between a terminal and a base station according to two allocation modes respectively associated with two transmission modes of the terminal having different priorities.

The issue with which the inventor was faced in the context of a terminal 100 supporting two transmission modes on the uplink, or UL, towards the base station 110 of a 5G network when the two modes in question have different levels of priority will now be described in relation to FIGS. 1, 2a and 2b. The invention is of course not limited to this particular type of fifth-generation radio communication network, but presents an interest for any type of network serving terminals supporting at least two types of transmission with different levels of priority.

Thus, the terminal 100 supports: a first transmission mode having a given level of priority, called standard transmission mode, for example a transmission of the eMBB type. In the case of a transmission of the eMBB type, this is an allocation implementing a single allocation zone per time interval (slot-based or SB allocation); and a second transmission mode having a level of priority greater than the standard level, called priority transmission mode. This is for example a transmission of the URLLC type requiring a reduced latency in the network with respect to the standard transmission of the eMBB type. In the case of a transmission of the URLLC type, this is an allocation implementing a plurality of allocation zones per time interval (non-slot-based or NSB allocation).

As discussed above, for such transmission modes, the access to the radio resources on the uplink is carried out by scheduling. The network considered multiplexes the data in resource blocks distributed in time and in frequency in time intervals 210 (for example radio frames of the standard in question). Thus, to allocate to the terminal 100 resource blocks on the uplink, the base station 110 (or alternatively a remote scheduler 120 for example) implements: the standard allocation mode associated with the standard transmission mode; and the priority allocation mode associated with the priority transmission mode.

In alternatives, the allocation modes in question are implemented by a remote scheduler 120 in the network. In other non-illustrated alternatives, the allocation modes are implemented in other remote devices in a server of the network.

Returning to FIGS. 1, 2a and 2b, for example to signal allocations to the terminal 100, the standard allocation mode uses only resource blocks 200s of temporally adjoining signalling portions (for example a monitoring occasion in the sense of the 3GPP) at the beginning or at the end of time intervals 210 on a downlink, or DL, between the base station 110 and the terminal 100 (for example the first three resource blocks of each radio frame). Such a signalling implementing a reduced number of signalling portions per time interval 210 allows for example to reduce the consumption of the terminal 100 by allowing it to only listen to the signalling channels of the network a reduced number of times per time interval 210.

In contrast, since the priority transmission mode requires a reduced latency in the network with respect to the standard transmission, the priority allocation mode uses for its signalling resource blocks 200p of signalling portions distributed throughout the time intervals 210 in order to reduce the delays related to the exchanges of information between the terminal 100 and the base station 110 even when this leads to additional consumption at the terminal 100.

Figure 2A:
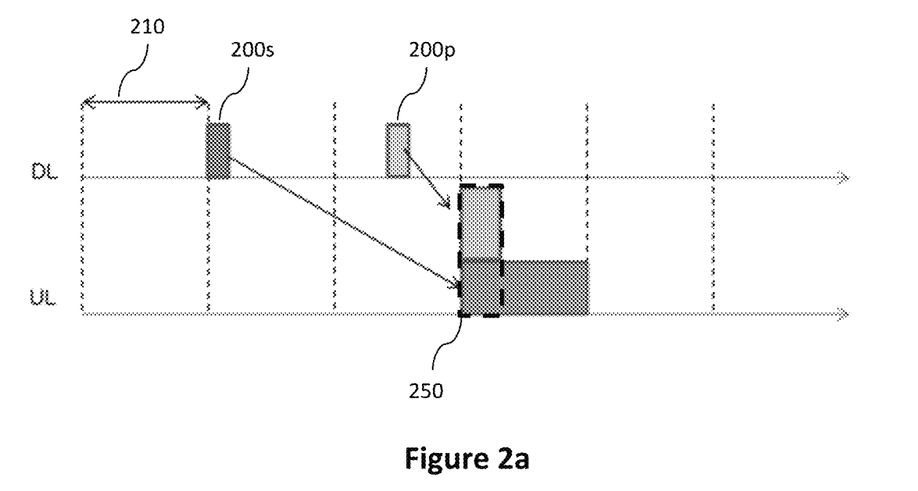

In such a context, since the network favours the priority allocation mode, it can happen that it allocates to the terminal 100, according to the priority allocation mode, at least one resource block 250 on the uplink that had previously been allocated according to the standard allocation mode, introducing a situation of allocation collision as illustrated in FIG. 2a.

In such a situation, the terminal 100 cannot use the same resource block 250 on the uplink for the simultaneous transmission according to the two transmission modes and thus also favours the priority transmission mode. The terminal 100 thus transmits to the base station 110 the data associated with the priority transmission mode by using the resource block 250.

Figure 2B:
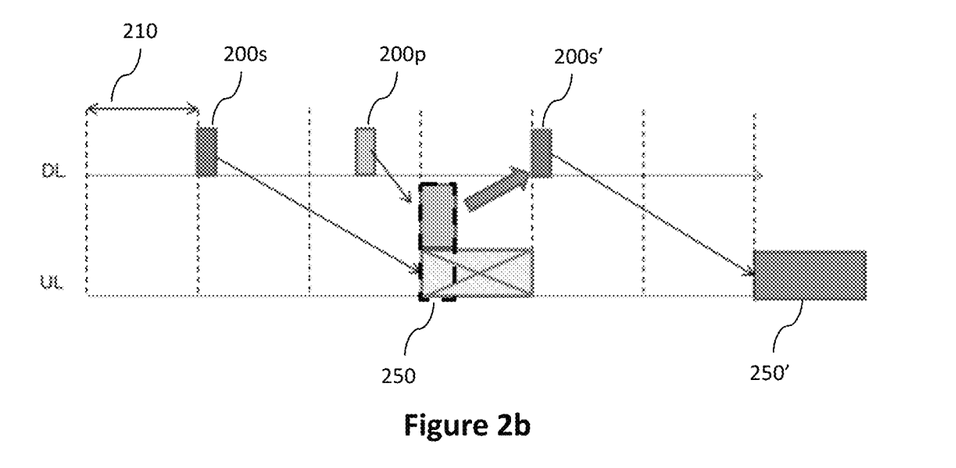

The terminal then waits to receive a new allocation via a new resource block 200s' of another signalling portion in order to be allocated a new resource block 250' on the uplink according to the standard allocation mode as illustrated in FIG. 2b.

Such a mechanism thus causes an increased latency for the standard transmission mode, in particular if it is repeated.

Optimisation of the Allocation According to the Invention

The steps of a method for allocating resources on the uplink between the terminal 100 and the base station 10, as well as the steps of a method for reception, by the terminal 100, of an allocation of resources on the uplink in question according to various embodiments of the invention will now be described in relation to FIGS. 3 and 4. Moreover, the steps in question as well as their implementation in various embodiments considered are illustrated by examples described in relation to FIGS. 5a, 5b and 6.

More particularly, according to the proposed approach, in a situation of collision as described above in relation to FIGS. 2a and 2b, the network implements a temporary allocation mode to allocate at least one replacement resource block 250r in the standard transmission mode to allow the terminal to transmit the data associated with the standard transmission mode that it was not able to transmit in the resource block 250. Reciprocally, the terminal 100 receives the information on resource allocation according to the temporary allocation mode for the allocation of at least the replacement resource block 250r in the standard transmission mode.

Moreover, to signal allocations to the terminal, the temporary allocation mode uses 100 resource blocks 200r of signalling portions that are present in a number greater than that used in the standard allocation mode, in each time interval. For example, in one alternative, the temporary allocation mode uses resource blocks 200r of signalling portions distributed according to an equally distributed temporal schema inside time intervals 210 on the downlink whereas the standard allocation mode uses only resource blocks 200s of signalling portions temporally adjoining at the beginning or at the end of time intervals time interval 210. In another alternative, the temporary allocation mode uses resource blocks 200r of signalling portions distributed according to a temporal schema identical to that implemented by the priority allocation mode. Therefore, the number of temporal schemas to be managed by the terminal 100 is minimised.

Regardless of the signalling alternative considered for the temporary allocation mode, the terminal 100 thus has a greater chance of being allocated in a short time the replacement resource block 250r in order to emit the data associated with the standard transmission mode that is on standby after the situation of temporal collision. This reduces the latency associated with the standard mode of transmission in the radio communication network.

Thus, according to the invention, two distinct allocation modes, selectively implemented, are associated with at least one of the transmission modes, in particular the standard transmission mode. In particular, a switch can be made from a standard allocation mode of the SB type to a temporary allocation mode of the NSB type.

Allocation Method

To obtain this result, the network can implement the following steps (FIG. 3):
allocating E300, to the terminal 100, at least one resource block 250 on the uplink according to the standard allocation mode;
allocating E310, to the terminal 100, at least the same resource block 250 on the uplink according to the priority allocation mode;
detecting E320 a situation of temporal collision between the allocations of the resource block 250; and
temporarily changing E430 (illustrated by the arrow 500 in FIGS. 5a and 5b) the mode of resource allocation associated with the standard transmission mode from the standard allocation mode to the temporary allocation mode to allocate E340 the replacement resource block 250r. Moreover, the temporary change is triggered by the detection of the situation of collision.

Method for Receiving an Allocation Implemented in the Terminal

Symmetrically, the terminal implements the following steps (FIG. 4):
receiving E400 an allocation of at least one resource block 250 on the uplink allocated according to the standard allocation mode;
receiving E410 an allocation of at least the same resource block 250 on the uplink allocated according to the priority allocation mode;
detecting E420 a situation of temporal collision between the allocations of the at least one resource block 250; and
temporarily changing E430 the mode of reception of an allocation of resources associated with the standard transmission mode from the standard mode of reception of an allocation to the temporary mode of reception of an allocation to receive E440 the allocation of the replacement resource block 250r. Moreover, the temporary change is triggered by the detection of the situation of collision.

In alternatives, the temporary change E430 is triggered in the terminal 100 by the effective transmission of the data associated with the priority transmission mode via the resource block 250.

Returning to FIG. 4, it is noted that the terminal implements the invention by implementing the steps symmetrical to those implemented by the network without requiring additional signalling between the base station 110 and the terminal 100. This further minimises the overall consumption of the system, and in particular that of the terminal 100, as well as the load on the network.

To do this, the standard and temporary modes of reception of an allocation are for example programmed by the network on the terminal 100 when the latter connects to the base station 110 (for example via the RRC protocol layer, for Radio Resource Control).

In contrast, in other non-illustrated embodiments, the terminal 100 is a slave of the network and receives information on temporary change of mode of reception of an allocation from the base station 110. Thus, the terminal 100 does not have to itself implement the change in the mode of reception of an allocation associated with the standard transmission. Moreover, the network remains master of the mode of reception of an allocation implemented by the terminal 100, thus avoiding any misalignment between the allocation mode implemented by the network and the mode of reception of an allocation implemented by the terminal 100.

Interruption of the Temporary Allocation Mode

Figure 3:
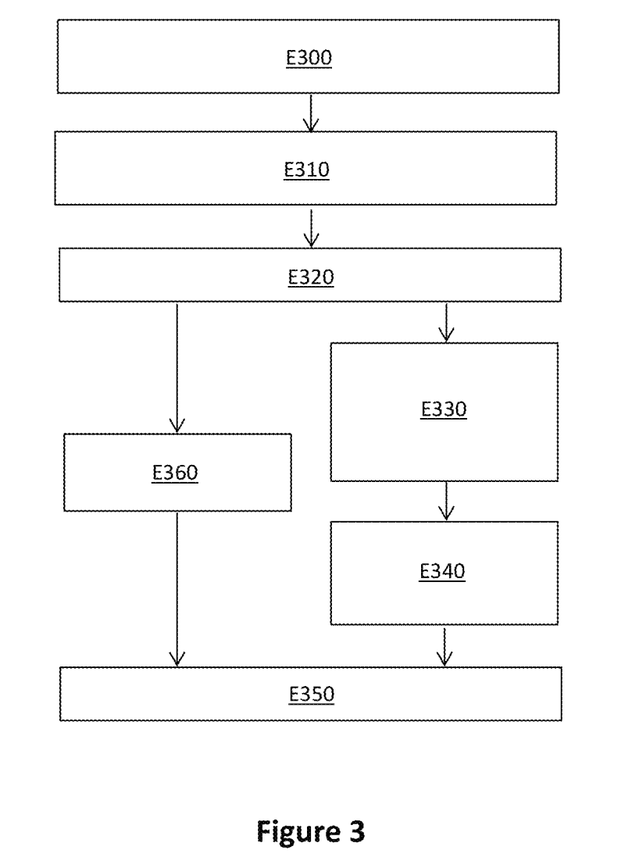
FIG. 3 illustrates steps of a method for allocating resources on the uplink between the terminal and the base station of FIG. 1 according to an embodiment of the invention.

In the embodiment illustrated in FIG. 3, the end of the implementation of the temporary allocation mode is triggered by the allocation to the terminal 100 of the replacement resource block 250r.

Figure 5A:
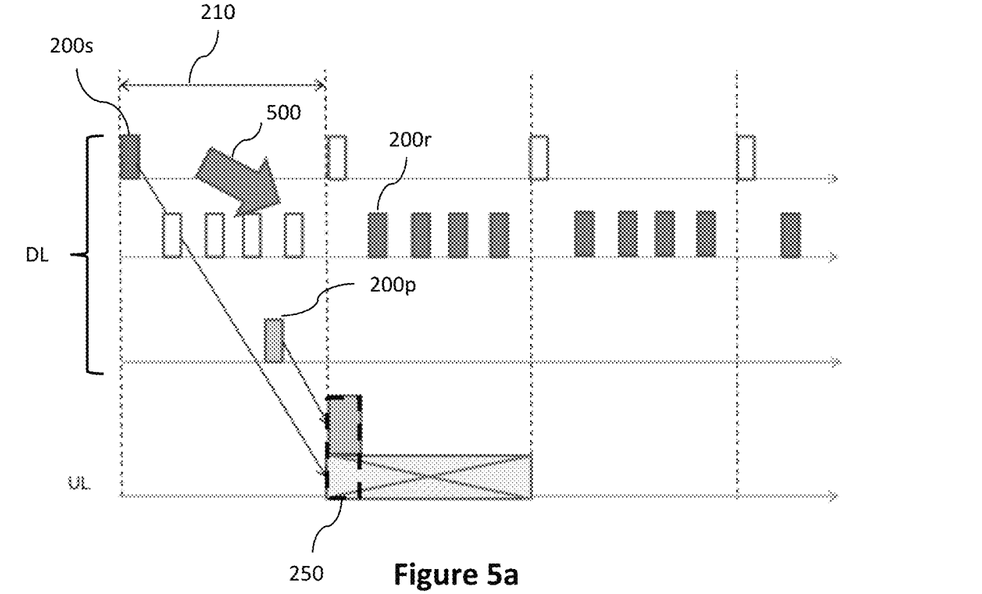
FIGS. 5a and 5b illustrate the temporary change, obtained by applying the methods of FIGS. 3 and 4, of the allocation mode associated with the transmission mode having the lower priority of the terminal of FIG. 1.
Figure 5B:
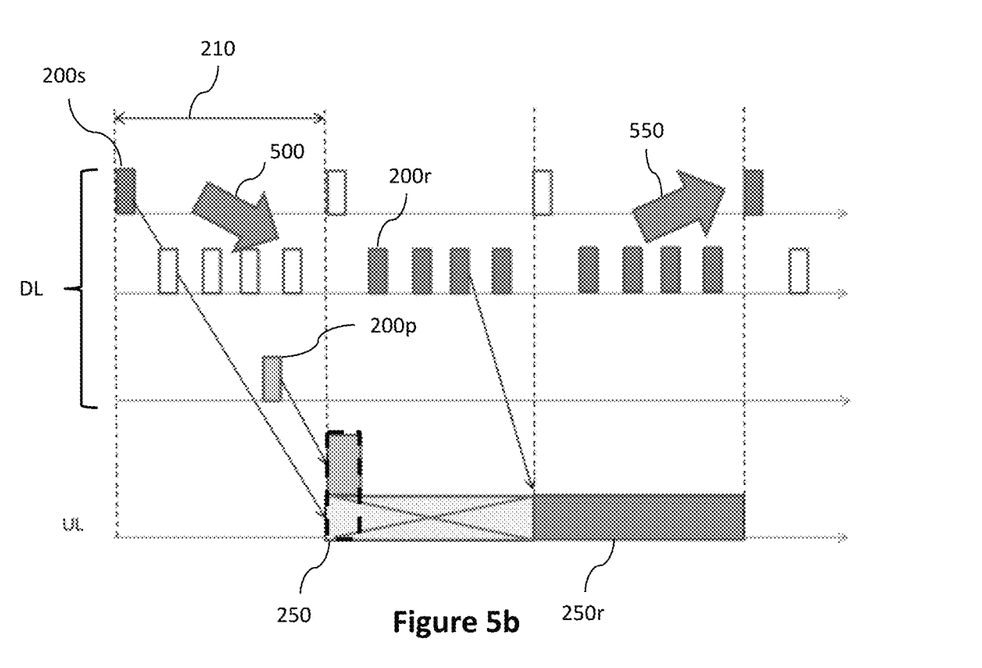

Therefore, the network implements in this embodiment a step E350 of return to the standard allocation mode (embodied by the arrow 550 in figure Sb) for the standard transmission mode, after the allocation of the replacement resource block 250r.

Thus, the additional consumption related to the use of the priority temporary allocation mode is controlled (the priority temporary allocation mode consuming more energy than the standard mode because of the greater frequency of the signalling).

Symmetrically, the terminal implements (FIG. 4) a step E450 of return to the standard mode of reception of an allocation for the standard transmission mode after the reception of the allocation of the replacement resource block 250r.

In alternatives, other criteria can also be taken into account to trigger the return to the implementation of the standard allocation mode for the standard transmission mode. For example, a criterion of end of the situation of collision as described above can also be taken into account (alone or in combination with the aforementioned criterion of allocation of the replacement resource block 250r). Indeed, such a situation of collision can persist over time in the case of significant needs in terms of radio resources for the priority transmission mode.

Figure 4:
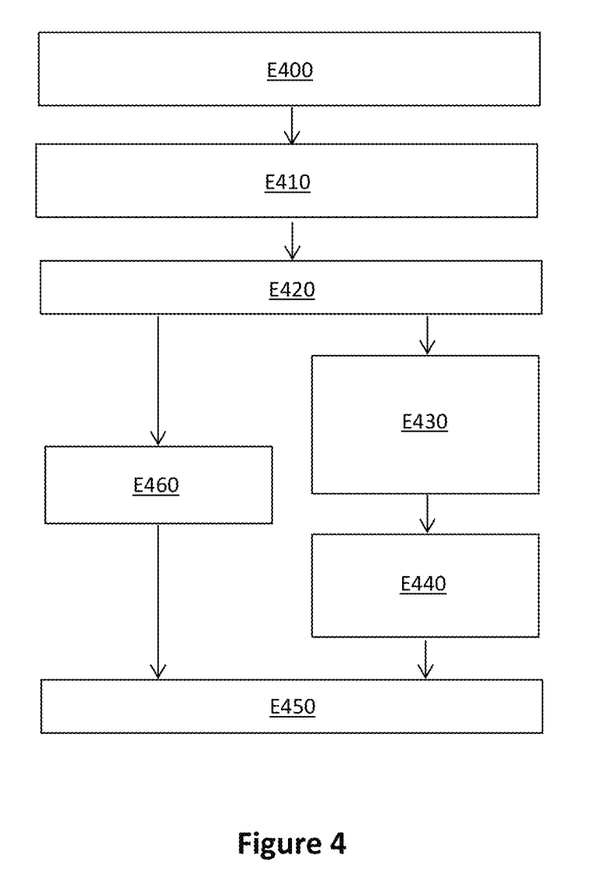
FIG. 4 illustrates steps of a method for reception, by the terminal of FIG. 1, of an allocation of resources on the uplink in question according to an embodiment of the invention.

In the embodiment illustrated in FIGS. 3 and 4, the temporary allocation mode is implemented over a predetermined period of time, for the allocation of the replacement resource block 250r. Therefore, after this period of time has passed, the standard allocation mode is once again implemented systematically.

To do this, the network (FIG. 3), and respectively the terminal (FIG. 4), implement a step of triggering E360, and respectively E460, a counter upon detection of the situation of temporal collision. In this case, the step of return E350, and respectively E450, to the standard allocation mode for the standard transmission mode is implemented if the allocation mode currently associated with the standard transmission mode is the temporary allocation mode, and the counter indicates that a predetermined period of time has passed since the triggering in question.

Thus, when the predetermined period of time has passed, if the network has not yet been able to allocate a resource to the terminal according to the temporary allocation mode (for example if the network is busy since it is overloaded), the corresponding modes of allocation and of reception still go back to the standard modes in order to control the energy consumption of the system.

However, in other non-illustrated embodiments, such a mechanism of return to the standard allocation mode after a predetermined period of time is not implemented in order to maximise the chances of being allocated a replacement resource block via the temporary allocation mode even when the network is loaded.

Use of Resource Blocks Common to the Two Allocation Modes

Figure 6:
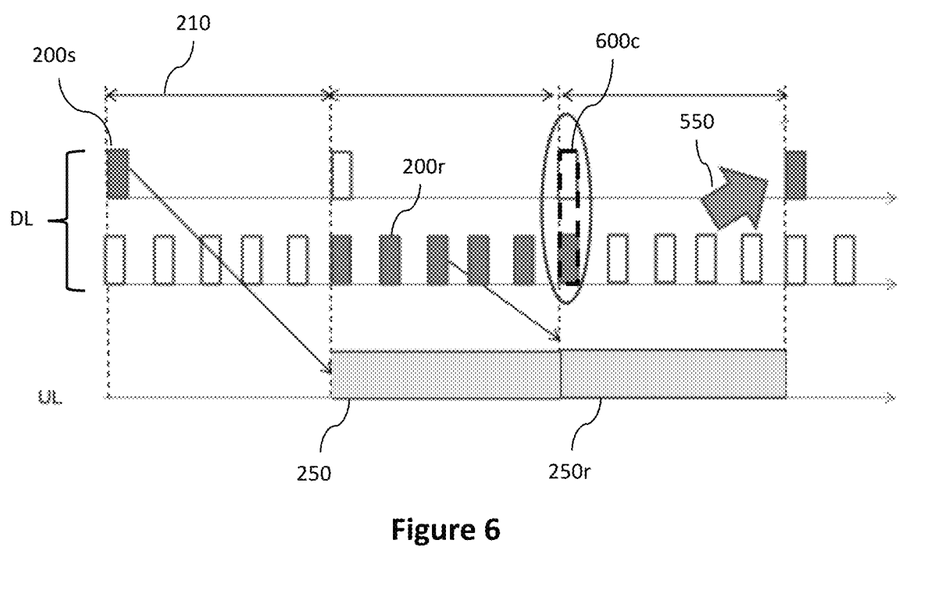
FIG. 6 illustrates a signalling alternative used in the allocation modes associated with the transmission mode having the lower priority of the terminal.

In a signalling alternative illustrated in FIG. 6, the standard and temporary allocation modes use, for the signalling of the allocations to the terminal, certain common resource blocks 600c.

Indeed, as illustrated in FIG. 5b, the base station 110 goes back to the implementation of the standard allocation mode when it has allocated the replacement block 250r according to the temporary allocation mode (aforementioned step E350). Symmetrically, the terminal once again implements the standard mode of reception of an allocation for the standard transmission mode after the reception of an allocation of a replacement resource block 250r (aforementioned step E450). However, it can happen that the terminal 100 does not receive the allocation according to the temporary allocation mode (for example if the propagation conditions are so poor that the terminal was not able to decode the signal received).

In this case, the mode of reception of an allocation implemented by the terminal 100 remains the temporary mode while the allocation mode implemented by the network again becomes the standard mode, thus leading to a misalignment between the terminal 100 and the network. Thus, the use of common resource blocks 600c allows the terminal to receive an allocation of a resource even when the mode of reception of an allocation that it implements is not the mode of reception adapted to the allocation mode implemented by the network.

Signalling for the Common Resource Blocks

In certain alternatives, the common resource blocks 600c comprise a field for identification of allocation mode indicating to the terminal 100 which one out of the standard and temporary allocation modes is implemented by the network in the standard transmission mode. This is for example a bit of information indicating the allocation mode used.

Thus, the terminal is capable of determining whether the mode of reception of an allocation that it implements is indeed the one adapted to the allocation mode implemented on the network side, or whether it must change its mode of reception.

Examples of Implantation of the Methods

Figure 7:
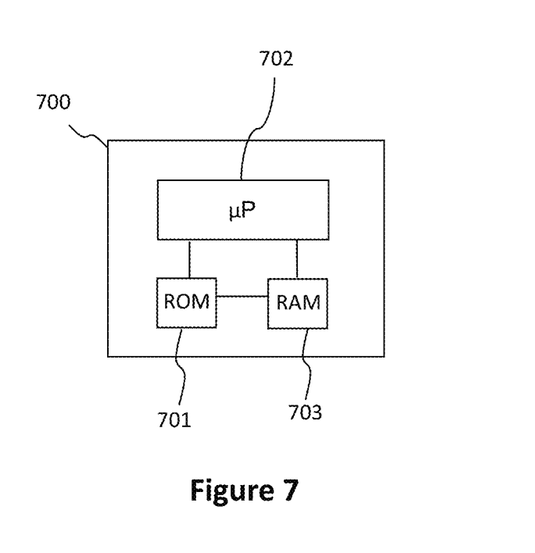
FIG. 7 presents a simplified example of structure of a module intended to implement the allocation method of FIG. 3.

FIG. 7 shows an example of a module 700 for allocation of resources. More particularly, such a module 700 allows the implementation of the method for allocating resources of FIG. 3. The module 700 comprises a random-access memory 703 (for example a RAM), a processing unit 702 equipped for example with a processor, and controlled by a computer program stored in a read-only memory 701 (for example a ROM or a hard disk). Upon initialisation, the code instructions of the computer program are for example loaded into the random-access memory 703 before being executed by the processor of the processing unit 702.

This FIG. 7 illustrates only a particular manner, out of several possibilities, of creating the means comprised in the module 700, in order for it to carry out certain steps of the method for allocating resources described in detail above, in relation to FIG. 3 (in any one of the various embodiments). Indeed, these steps can be carried out indifferently on a reprogrammable calculation machine (a PC, a DSP or a microcontroller) executing a program comprising a sequence of instructions or on a dedicated calculation machine (for example a set of logic gates such as an FPGA or an ASIC, or any other hardware module). In the case in which the means comprised in the module 700 are created with a reprogrammable calculation machine, the corresponding program (that is to say the sequence of instructions) can be stored in a storage medium that is removable (for example such as a floppy disk, a CD-ROM or a DVD-ROM) or not, this storage medium being partly or entirely readable by a computer or a processor.

In certain embodiments, such a module 700 is included in the terminal 100. In other embodiments, the module 700 for allocating resources according to the invention is a piece of software embedded for example in the overall software of the terminal 100.

Figure 8:
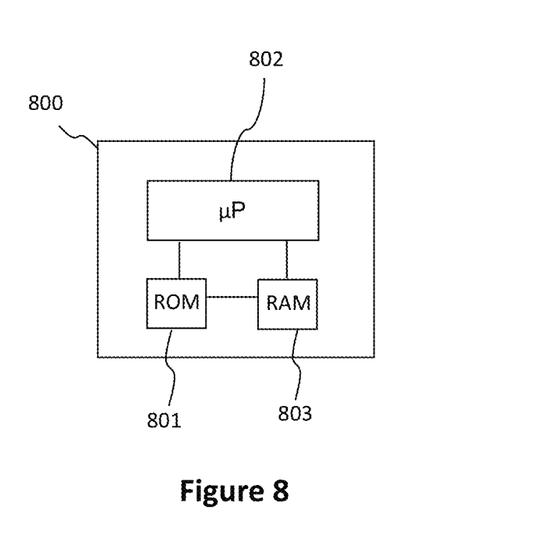
FIG. 8 presents a simplified example of structure of a module intended to implement the method for receiving an allocation of FIG. 4.

FIG. 8 shows an example of a module 800 for receiving an allocation of resources. More particularly, such a module 800 allows the implantation of the method for receiving an allocation of resources of FIG. 4. The module 800 comprises a random-access memory 803 (for example a RAM), a processing unit 802 equipped for example with a processor, and controlled by a computer program stored in a read-only memory 801 (for example a ROM or a hard disk). Upon initialisation, the code instructions of the computer program are for example loaded into the random-access memory 803 before being executed by the processor of the processing unit 802.

This FIG. 8 illustrates only a particular manner, out of several possibilities, of creating the means comprised in the module 800, in order for it to carry out certain steps of the method for receiving an allocation of resources described in detail above, in relation to FIG. 4 (in any one of the various embodiments). Indeed, these steps can be carried out indifferently on a reprogrammable calculation machine (a PC, a DSP or a microcontroller) executing a program comprising a sequence of instructions or on a dedicated calculation machine (for example a set of logic gates such as an FPGA or an ASIC, or any other hardware module). In the case in which the means comprised in the module 800 are created with a reprogrammable calculation machine, the corresponding program (that is to say the sequence of instructions) can be stored in a storage medium that is removable (for example such as a floppy disk, a CD-ROM or a DVD-ROM) or not, this storage medium being partly or entirely readable by a computer or a processor.

In certain embodiments, such a module 800 is included for example in the base station 110 or in a remote scheduler 120 in the network. In other embodiments, the module 800 for receiving an allocation of resources according to the invention is a piece of software embedded for example in the overall software of the base station 110 or of the scheduler 120.

The invention claimed is:

1. A method of allocating resources on an uplink between a user terminal and a base station of a radio communication network multiplexing the data in resource blocks distributed in time and frequency in time intervals, the method comprising:
    implementing at least two modes of resource allocation:
        a standard allocation mode associated with a standard transmission mode of transmission by the terminal, and implementing at least one signalling portion containing information on resource allocation in each time interval; and
        a priority allocation mode associated with a priority transmission mode of transmission by the terminal;
    wherein the network favors the priority allocation mode and can allocate to the terminal, according to the priority allocation mode, at least one resource block previously allocated according to the standard allocation mode, introducing a situation of allocation collision,
    and in that, in such a situation of collision, the network implements a temporary allocation mode to allocate at least one replacement resource block in the standard transmission mode, implementing a number of signalling portions containing information on resource allocation greater than that used in the standard allocation mode, in each time interval, the temporary allocation mode having a signalling frequency greater than a signalling frequency of the standard transmission mode.

2. The allocation method of claim 1, comprising:
    allocating, to the terminal, at least one first resource block on the uplink according to the standard allocation mode;
    allocating, to the terminal, at least the first resource block on the uplink according to the priority allocation mode;
    detecting a situation of temporal collision between the allocations of the at least one first resource block; and
    temporarily changing the mode of resource allocation associated with the standard transmission mode from the standard allocation mode to the temporary allocation mode to allocate the at least one replacement resource block, the temporary change being triggered by the detection.

3. The allocation method of claim 2, further comprising returning to the standard allocation mode for the standard transmission mode, after the allocation of the at least one replacement resource block.

4. The method of claim 1, wherein, after a situation of collision, the temporary allocation mode is implemented over a predetermined period of time, for the allocation of at least one replacement resource block for the standard transmission mode, and in that after the period of time, the standard allocation mode is once again implemented.

5. The method of claim 1,
    wherein, for signal allocations to the terminal, the standard allocation mode uses only temporally adjoining resource blocks at the beginning or at the end of time intervals on a downlink between the base station and the terminal, and
    wherein, for signal allocations to the terminal, the temporary allocation mode uses resource blocks distributed according to an equally distributed temporal schema inside time intervals on the downlink.

6. The method of claim 1,
wherein the radio communication network is of a fifth-generation cellular type,
wherein the standard transmission mode is of an eMBB (enhanced Mobile Broadband) type, and
wherein the priority transmission mode is of an URLLC (Ultra-Reliable and Low Latency Communications) type.

7. A computing environment comprising a processor and a memory, the memory storing program code instructions executed by the processor for the implementation of the method of claim 1.

8. The method of allocating of claim 1,
wherein, for at least one given resource block allocated selectively according to the standard allocation mode or the temporary allocation mode for the standard transmission mode, information on allocation of the at least one given resource block is transmitted towards the terminal in at least one common resource block of a signalling portion.

9. The method of claim 8, wherein the at least one common resource block comprises a field for identification of allocation mode indicating to the terminal which one out of the standard and temporary allocation modes is implemented in the standard transmission mode.

10. A method of reception, by a user terminal, of an allocation of resources on an uplink between the terminal and a base station of a radio communication network multiplexing data in resource blocks distributed in time and in frequency in time intervals, the reception method comprising:
receiving information on resource allocation according to at least two modes of resource allocation:
a standard allocation mode of resource allocation by the network associated with a standard transmission mode of transmission by the terminal, the standard allocation mode implementing at least one signalling portion containing information on resource allocation in each time interval; and
a priority allocation mode of resource allocation by the network associated with a priority transmission mode of transmission by the terminal;
wherein, when at least one resource block previously allocated according to the standard allocation mode is then allocated according to the priority allocation mode, introducing a situation of allocation collision, the terminal receives information on resource allocation according to a temporary allocation mode for the allocation of at least one replacement resource block in the standard transmission mode, implementing a number of signalling portions greater than that used in the standard allocation mode, in each time interval, the temporary allocation mode having a signalling frequency greater than a signalling frequency of the standard transmission mode.

11. The method of receiving an allocation of claim 10, comprising:
receiving an allocation of at least one first resource block on the uplink allocated according to the standard allocation mode;
receiving an allocation of the at least one first resource block on the uplink allocated according to the priority allocation mode;
detecting a situation of temporal collision between the allocations of the at least one first resource block; and
temporarily changing the mode of reception of an allocation of resources associated with the standard transmission mode from the standard mode of reception of an allocation to the temporary mode of reception of an allocation to receive the allocation of the at least one replacement resource block, the temporary change being triggered by the detection.

12. The method of receiving an allocation of claim 11, further comprising returning to the standard mode of reception of an allocation for the standard transmission mode after the reception of the allocation of the at least one replacement resource block.

13. The method of receiving an allocation of claim 10, wherein, for at least one given resource block allocated selectively according to the standard allocation mode or the temporary allocation mode for the standard transmission mode, information on allocation of the at least one given resource block is transmitted towards the terminal in at least one common resource block of a signalling portion.

14. The method of claim 13, wherein the at least one common resource block comprises a field for identification of allocation mode indicating to the terminal which one out of the standard and temporary allocation modes is implemented in the standard transmission mode.

15. A module for allocating resources on an uplink between a user terminal and a base station of a radio communication network multiplexing data in resource blocks distributed in terms of time and in terms of frequency in time intervals, the allocation module comprising
allocation means implementing at least two modes of resource allocation:
a standard allocation mode associated with a standard transmission mode of transmission by said terminal, and implementing at least one signalling portion containing information on resource allocation in each time interval; and
a priority allocation mode associated with a priority transmission mode of transmission by said terminal;
wherein the means favor the priority allocation mode and can allocate to the terminal, according to the priority allocation mode, at least one resource block previously allocated according to the standard allocation mode, introducing a situation of allocation collision,
and in that, in such a situation of collision, the means implement a temporary allocation mode to allocate at least one replacement resource block in the standard transmission mode, implementing a number of signalling portions containing information on resource allocation greater than that used in the standard allocation mode, in each time interval, the temporary allocation mode having a signalling frequency greater than a signalling frequency of the standard transmission mode.

16. A module for reception, by a user terminal, of an allocation of resources on an uplink between the terminal and a base station of a radio communication network multiplexing data in resource blocks distributed in terms of time and in terms of frequency in time intervals, the reception module comprising:
reception means for receiving information on resource allocation according to at least two modes of resource allocation:
a standard allocation mode of resource allocation by the network-associated with a standard transmission mode of transmission by the terminal, the standard allocation mode implementing at least one signalling portion containing information on resource allocation in each time interval; and a priority allocation mode of resource allocation by the network associated with a priority transmission mode of transmission by the terminal;

wherein, when at least one resource block previously allocated according to the standard allocation mode is then allocated according to the priority allocation mode, introducing a situation of allocation collision, the means receive information on resource allocation according to a temporary allocation mode for the allocation of at least one replacement resource block in the standard transmission mode, implementing a number of signalling portions greater than that used in the standard allocation mode, in each time interval, the temporary allocation mode having a signalling frequency greater than a signalling frequency of the standard transmission mode.

* * * * *